United States Patent [19]

Maillet et al.

[11] Patent Number: 4,862,975

[45] Date of Patent: Sep. 5, 1989

[54] DRILLING FLUID ADDITIVE

[76] Inventors: Bonnie B. Maillet; Jerome L. Begnaud, both of P. O. Box 53648, Lafayette, La. 70505

[21] Appl. No.: 88,677

[22] Filed: Aug. 24, 1987

[51] Int. Cl.$^4$ .................. C09K 7/00; E21B 33/138
[52] U.S. Cl. ......................... 175/72; 252/8.512; 166/294
[58] Field of Search ............... 175/72; 166/292, 294; 252/8.512

[56] References Cited

U.S. PATENT DOCUMENTS

| | | |
|---|---|---|
| 1,807,082 | 5/1931 | Boynton . |
| 2,124,495 | 7/1938 | Miller . |
| 2,779,417 | 1/1957 | Clark, Jr. . |
| 3,219,111 | 11/1965 | Armentrout . |
| 3,411,581 | 11/1968 | Alpha .................................. 175/72 |
| 3,568,782 | 3/1971 | Cox ..................................... 175/72 |
| 4,222,444 | 9/1980 | Hamilton ............................ 175/72 |
| 4,247,403 | 1/1981 | Foley et al. ..................... 175/72 X |
| 4,369,844 | 1/1983 | Clear ................................. 166/294 |
| 4,474,665 | 10/1984 | Green ............................. 175/72 X |

FOREIGN PATENT DOCUMENTS 789875  7/1968  Canada ................................ 175/72

OTHER PUBLICATIONS

"Principles of Drilling Fluid Control", pp. 198, 1980.
Darley et al., "Composition and Properties of Drilling and Completion Fluids", 5th Ed. Mar. 1988 pp. 447, 451, 598.
Rogers, W. F., "Composition and Properties of Oil Well Drilling Fluids", 3rd Edition, 1963, p. 664.

*Primary Examiner*—Bruce M. Kisliuk
*Attorney, Agent, or Firm*—Vaden, Eickenroht, Thompson & Boulware

[57] ABSTRACT

There is disclosed, for use as a drilling fluid additive, a mass of small particles of the shells of curstaceous animals selected from a class consisting of crab and crayfish.

2 Claims, No Drawings

DRILLING FLUID ADDITIVE

This invention relates generally to the drilling of an oil or gas well wherein a drilling fluid or "mud" is circulated downwardly within a rotary drill string and upwardly within the annulus between the string and well bore for the purpose of raising cuttings from the bottom of the well bore to the surface where they can be removed from the drilling fluid, and maintaining a hydrostatic pressure in the annulus which contains the pressure of the subsurface formations, and thus prevents blowouts or other problems often encountered in the drilling of a well. More particularly, this invention relates to improvements in the drilling of such a well wherein certain materials are added to the drilling fluid for the express purpose of preventing or reducing the loss of the drilling fluid from the well bore annulus as it is circulated within the well.

In order to maintain the hydrostatic pressure, the drilling fluid includes materials, such as barite, which are quite dense. In order to raise the cuttings to the surface, as well as maintain them in suspension even when circulation is stopped, the fluid contains materials such as Bentonite, in the case of water based drilling fluids, which are highly viscous.

One of the problems which is encountered in the drilling of a well is "lost circulation". This occurs when the drilling fluid seeps out of the annulus and into a formation, as through a fissure or through a porous sand formation. The loss of drilling fluid is not only expensive, but also may contaminate the formation fluid and upset the composition or recipe of the drilling fluid. To prevent or minimize this loss, certain materials are added to in the drilling fluid to cause it to form a "mud cake" lining in the well bore and thus effectively "seal" the drilling fluid from entry into the formation. These additives may comprise polymer gels which cross link in situ, but which are so expensive as to prevent their use on a large scale. Or, they may comprise by-products which are inexpensive and readily available in large quantities. Examples of the latter are wood chips, wood fibers, mica and ground up walnut shells.

The injection of dispersed solids creates new problems even while solving others in that a higher concentration of solids also increases the likelihood of an induced fracture of the formation. A recent refinement in sealing techniques known as "sweeping", calls for the deliberate injection of a "slug" or "pill"—that is, a relative small volume of mud with a large solid content. In the ideal case that slug does not mix with the rest of the mud, but instead travels within the well bore until it encounters a loss zone. At that point, sealing occurs, while the now slightly depleted slug completes its circuit by returning to the rig, where the operator diverts the mud flow briefly in order to take the heavy pill out of the system.

Sweeping reduces the risk of inducing a fracture, because the circulating mass of fluid does not exert a sustained force on the surrounding earth as occurs in bulk introduction of fillers into the mud. At the same time, aside from the mere cost of the additive itself, the operator must worry about the resulting changes in the overall mud characteristics.

Among other things, the additive must not so modify the properties of the drilling fluid, such as viscosity, pH and temperature stability, as to render it unmnagable, particularly when used in large quantities and/or under severe conditions. Also, the additive must have such physical characterics as to fascilitate formation of a seal in the mud cake which lines the well bore, such as, for example, the plating affect of wood chips or the matting effect of fibers.

The object of this invention is to provide a lost circulation material which, in addition to possessing these and other desirable characteristics, is made from a readily available, inexpensive by-product which is in great supply and has no other known uses such that it is a waste disposal problem.

This and other objects are accomplished, in accordance with the present invention, by a lost circulation material comprising ground up or pulverized particles of the shells of crab or crayfish, which may be added to the drilling fluid at such time and in such quantity as may be thought necessary or desirable by the operator of the well to control the loss of drilling fluid circulating through the well. Thus, shells of this type are in such large quantity that they have become a waste removal problem, particularly as a result of the ever increasing popularity of their meat, which represents only a minor fraction of the weight of the animal.

For example, it has been estimated that more than one million pounds of such shells are generated per year. To date, their only known uses are as a filler for cattle and fish feed and a coloring agent. Ideally, only the meat or organic matter remaining in the shell would be used as the filler. However, in the interest of reducing costs and avoiding waste disposal problems, the entire shell is used. For this purpose, the shell may be ground to suitable size and often pelletized. Only the chitin or small part of the shell which is a naturally occuring pigment is fed to fish to give them a pink color. Thus, this use although small in comparison creates its own waste removal problem.

To render them useful for purposes of the present invention, including packaging and storing pending sale and shipment to a well site, the shells are first cleaned or stripped to remove the majority of meat or organic matter left in them as waste by-products, and then rinsed thoroughly with water, and possibly detergent to prevent rot. The cleaned shells are then dryed at about 350° C. for approximately 24 hours to remove approximately 90% of their naturally occurring water. Finally, the dryed shells are ground to appropriate particle size, the actual size depending on the use to which they are to be put as a lost circulation additive.

Among other things, the shell particles have the ability to plate, much like fish scales, and thus enable the formation of a seal about the well bore. Also, they do not so modify the characteristics of the base drilling fluid as to substantially modify its properties, such as viscosity, pH and temperature stability or otherwise render it unmanageable.

From the foregoing it will be seen that this invention is one well adapted to attain all of the ends and objects hereinabove set forth, together with other advantages which are obvious and which are inherent to the method.

What is claimed:

1. In the drilling of an oil or gas well wherein drilling fluid is circulated downwardly within a rotary drill string and upwardly within the annulus between the string and well bore, the step of adding to the drilling fluid for circulation therewith small particles of the shells of crustaceous animals selected from a class consisting of one or both of crab and crayfish.

2. For use as an additive to a drilling mud which is adapted to be circulated downwardly within a drill string and upwardly with the annulus between the drill string and well bore, a mass of small particles of the shells of crustaceous animals selected from a class consisting of one or both of crab and crayfish.

* * * * *